United States Patent Office 3,431,241
Patented Mar. 4, 1969

3,431,241
MONOISOCYANATE CONDENSED RESORCINOL-ALDEHYDE RESINS
Roy H. Moult and Richard T. Hood, Murrysville, Pa., assignors to Koppers Company, Inc., a corporation of Delaware
No Drawing. Filed May 15, 1967, Ser. No. 638,560
U.S. Cl. 260—54          9 Claims
Int. Cl. C08g 5/10, 5/18; C09j 3/16

ABSTRACT OF THE DISCLOSURE

Novel monoisocyanate condensed resorcinol-aldehyde resins are prepared by substantially dehydrating a resorcinol-aldehyde resin and reacting the dehydrated resin with from 2–20 mole percent of a monoisocyanate per mole of resorcinol in the initial resin. The novel resins are used in adhesive dips to bond polyester and other tire cord to rubber in tire manufacture.

Background of the invention

Polyester fiber has various desirable characteristics as a reinforcement for rubber articles. Polyester fibers exhibit high tensile strength, absorb less moisture than nylon and rayon, and stretch less than other fibers, resulting in greater dimensional stability of articles reinforced therewith. Since polyester fibers also resist heat much better than nylon and rayon, polyester cords are highly desirable as a reinforcing article for tires. But, difficulties in properly wetting polyester fibers have retarded the development of polyester fiber reinforced tires. Many adhesives proposed for bonding of polyester cord to rubber have been commercially unacceptable either because of insufficient bond strength, poor heat resistance, poor flex life or difficulty of application.

Various methods of increasing the adhesion of polyester tire cord to rubber have been proposed, including the addition of various compounds to rubber to modify its properties, and the preparation of specific and exotic adhesives. Polyisocyanates have been suggested for use in adhering textile fibers to rubber. The instability and toxicity of such polyisocyanates, however, is a deterrent to their use in manufacturing processes.

A product formed by the reaction of a monoisocyanate with monomeric phenols has been proposed for use in tire cord adhesives in Belgian Patent 674,529. These products, the reaction product of a monoisocyanate with a phenol have been found to be incompatible with various useful adhesive dips for bonding of polyester tire cord to rubber.

In contrast, it has been found that the reaction of a specific proportion of monoisocyanate with a previously prepared and preferably dehydrated resorcinol-aldehyde resin, produces adhesives which provide good compatibility with adhesive dips and excellent adhesion of polyester cord to rubber.

Summary of the invention

In accordance with the present invention, resorcinol-aldehyde resins are made by a process comprising substantially dehydrating a previously prepared resorcinol-aldehyde resin to remove any free water present and reacting the dehydrated resin at an elevated temperature with from 0.02–0.20 mole, per mole of resorcinol in said resin, of a monoisocyanate of the formula:

R—N=C=O wherein R is lower alkyl, lower alkenyl, cyclohexyl, phenol, lower alkyl phenyl, chlorophenyl and lower alkoxy phenyl.

The novel monoisocyanate-modified resorcinol-aldehyde resin can then be used in adhesive dips used to bond polyester and other tire cord to rubber.

In the process, the new resins are prepared by reacting a preferably dehydrated, resorcinol-aldehyde resin with a monoisocyanate at an elevated temperature. The preferred resins are prepared from resorcinol and formaldehyde. Other aldehydes than formaldehyde may be used in the preparation of the resorcinol resin for use in the present invention, such as acetaldehyde, propionaldehyde, butyraldehyde, and the like. The resin need only contain free hydroxyl groups for reaction with the monoisocyanate, allowing the use of various aldehydes in the resin formation.

Useful monoisocyanates are the lower alkyl isocyanates, such as methyl isocyanate, ethyl isocyanate, isopropyl isocyanate, butyl isocyanate, and the like. Also useful are the lower alkenyl isocyanates such as allyl isocyanate. In addition, there can be used aryl isocyanates such as phenyl isocyanate, which is especially useful, o-chlorophenyl isocyanate, tolyl isocyanate, and the methoxyphenyl isocyanates. Mixtures of the above monoisocyanates may also be used.

Before reacting the monoisocyanate and the resorcinol-aldehyde to produce the condensed resins of the invention, it is preferable that the water present in the resorcinol-aldehyde resin be removed. Water in the resin will react with the monoisocyanate, thus reducing the amount of monoisocyanate available for reaction with the resin. Even where the resorcinol-aldehyde resins have been previously prepared and no water is added, the resins are hygroscopic and water will be present in the resin. Conveniently, if the resin is heated to a temperature of about 140° C. at reduced pressures, this water can be removed. Preferably, the resin is heated to 140° C. at a pressure below about 50 mm. of mercury to remove the difficultly removable water. The resin is heated until no more water is evolved and is then ready for reaction with the monoisocyanates.

A mole ratio of about 0.02–0.2 mole of monoisoycanate to each mole of resorcinol present in the resin should be used in the reaction. If less than about 0.02 mole of monoisocyanate per mole of resorcinol is used, the properties of the resin are not adequate for use in the invention. If greater than about 0.2 mole of monoisocyanate per mole of resorcinol is used, the solubility of the resin product in sodium hydroxide is severely reduced, thus preventing solubilization of the condensed resins for use in tire cord dip adhesive compositions. Preferably, a mole ratio of about 0.05–0.10 mole of monoisocyanate per mole of resorcinol in the resin is used.

The reaction of the monoisocyanate and the dehydrated resorcinolaldehyde resin is carried out at a temperature of about 100–160° C. at atmospheric pressure. The progress of the reaction is readily ascertained by following the viscosity change in the resin. Initially, the resin has a high viscosity which, when the resin is reacted with the monoisocyanate, progressively decreases. The reaction time found sufficient for production of useful resins is about one hour at a temperature of 140–150° C., but would, of course, vary depending upon the specific reactants and the temperature employed.

Following the condensation of the resorcinol-aldehyde resin with the monoisocyanate, the reaction product is diluted with water to an adhesive containing about 70–75% solids. This dilution enables the resin to be poured or pumped conveniently.

The resin solution before it is used in an adhesive dip is adjusted to a pH of about 7.0. This pH is not critical, however, since a pH of 6.0 to 11.0 can be tolerated in the adhesive dip. If a latex having a basic pH is added to the resin in forming a dip, additional caustic may not be necessary.

The tire cord dip of the invention is made by forming an aqueous alkaline solution of the resin and a latex. The resin solution is diluted with sufficient water to reduce the concentration of the adhesive dip to less than about ten percent. The latex generally (about 41 percent solids) is then added to the resin solution. Depending upon the exact dip solids content desired, additional water may now be added for adjustment. Preferably, about 16 percent total solids is desired in the dip. Also, pH adjustments may be made at this point by the addition of an aqueous caustic solution. An alkaline substance, such as sodium hydroxide or ammonium hydroxide is added to the dip to adjust the pH to 6.0 to 11.0. However, if the preformed resin had added thereto a vinylpyridine latex (pH 10.2±0.4) the pH of the dip may not require further adjustment. The dip thus prepared is ready for immediate use, but dips have been used with good results after two weeks' storage, which is beyond normal requirements in commercial practice.

The dip may be formulated with various latices. A vinylpyridine-styrene-butadiene terpolymer latex may be employed as well as hot polymerized (2000 series) styrene-butadiene latex, cold polymerized (2100 series) styrene-butadiene latex, natural latex, reclaimed rubber dispersions, butyl rubber dispersion, or ethylene-propylene terpolymer rubber dispersions.

The adhesive of the invention is proposed specifically for the bonding of polyester tire cords, but may alternatively be used for bonding of rayon, nylon, polyolefin, glass, or metal cords to rubber with good results.

The dipped cord may be bonded to various kinds of rubber substrates including natural rubber, styrene-butadiene, polybutadiene, butyl-ethylene-propylene terpolymers, and the new synthetic-natural polyisoprene rubbers.

The resin adhesive dip in aqueous solution normally contains 15–25 percent solids, preferably about 16 percent solids. On a dry basis, the latex to resin ratio ranges between 6:1 and 14:1, preferably between 10:1 and 12:1. Conventional stabilizers such as zinc oxide may be added to the dip as desired.

In dipping, the polyester tire cord is treated under tension with the adhesive dip in a latex dipping machine. The dipped cord is then dried for about 40–240 seconds at 400–500° F., applied to the rubber stock and cured.

In applying the dip to polyester tire cords, a conventional dipping machine is employed whereby the cord is continuously drawn through the dip bath by system of pulleys, with a minimum of applied tension during its passage through the dip, in order to gain maximum wet pickup. The excess dip is removed by blowing the cord with air jets, vibration or by squeezing between rubber rolls, then conducting through a hot air tunnel at a temperature above 400° F. and up to about 500° F. The preferred temperature has been found to be about 450° F. and an upper limit for the temperature of curing is reached when degradation of the polyester cord results from such increased temperature.

During the hot drying phase of the process, the cord is stretched about 3–4 percent, and exposed for a sufficient time to cure the dip on the cord. The time necessary for the curing period must result in additional time for the penetration of the dip into the polyester cord. An acceptable exposure time of about 120 seconds (at 450° F.) has been found to be suitable.

The successful bonding of rubber to tire cord is measured by the static adhesion test. The H-test has been employed by the rubber industry to determine the static adhesion of textile cords to rubber. This test is specified as ASTM D–2138–63T and was employed in testing the adhesive of this invention.

The H-test is the method for the measurement of the force necessary to pull a single cord axially from a small block of rubber in which it is embedded. Ideally, the shear strength at the adhesive film-rubber or adhesive film-cord interface would be measured. In performing the test, two small blocks of rubber are bonded by an interconnecting cord to form a specimen which resembles the letter H, thus characterizing the test. The rupture is effected by pulling the specimens apart by means of two hook-type clamps; failure occurs when the bond in either one of the blocks is ruptured. The data, of course, evaluated as to the size of the specimen and temperature at which the test is performed.

The rubber tire industry has found that an H-test value in the order of 14 is acceptable, using a ¼ inch specimen at a test temperature of 212° F. when bonding polyester tire cord to rubber. Of course, the higher the value of the H-test, the better the bond and resulting product.

Our invention is further illustrated by the following examples.

EXAMPLE I

A quantity of resorcinol-formaldehyde resin was prepared generally according to the procedure described by P. H. Rhodes, in U.S. 2,385,372. An aliquot of this resin was removed to provide a Control. The remainder of the resin was dehydrated by distilling off free water at a pressure of 23 millimeters of mercury to a pot temperature of 140° C. An aliquot of the dehydrated resin, 2380 parts by weight, was charged to a reactor equipped with reflux condensor, stirrer and heat source. The resin was heated to 145° C. and phenyl isocyanate (91 grams, 0.05 mole per mole of resorcinol in the resin) added to the molten mass over a period of 30 minutes, maintaining the temperature at 140–145° C. The reaction mass was held at 140–150° C. for one hour, cooled and diluted with water to 75% solids and neutralized with 50% aqueous sodium hydroxide to a final pH of 7.5.

EXAMPLE II

A tire cord adhesive dip was prepared by adding 27 parts by weight of the modified resin prepared as in Example I, and 287 parts water to butadiene-vinylpyridine latex (Gen-Tac, 41% solids), with stirring at room temperature. The dip was allowed to stand one day before use. This dip was labeled Dip A.

A second adhesive dip was prepared using the aliquot of the resin (Control) prepared according to U.S. 2,385,372 using the same composition as Dip A, except that the control resin was substituted for the product resin of Example I.

These dips were used to coat polyester tire cord and the adhesion of the cord to rubber determined. In applying the dip to the cord, Dacron T–68 polyester, (1000 denier, 3-ply construction) the dipped cord was dried at an oven temperature of 450° C. and at an exposure time of 2–4 minutes. The dipped cord was applied to standard laboratory stock. The dipped cord was molded between plies of rubber stock for 20 minutes at 300° F. molding temperature. The results of the static H-test adhesion on ¼ inch specimens at 212° F. are shown in Table I.

Table I.—¼″ H-test at 212° F.

| | | |
|---|---|---|
| Dip A | [1]22.0 | [2]17.7 |
| Control | [1]17.9 | [2]15.4 |

[1] Cords cured 4 minutes at 450° F.
[2] Cords cured 2 minutes at 45° F.

EXAMPLE III

An alkyl-isocyanate resorcinol-aldehyde resin was prepared generally according to the procedure of Example I, except that allyl-isocyanate was substituted for phenyl-isocyanate. The resin was used to prepare a tire cord adhesive dip according to Example II and gave comparable H-test adhesive results.

EXAMPLE IV

A resin was prepared following Example I of Belgian Patent 674,529. Allyl isocyanate (25 parts) and resorcinol (104 parts) was stirred at 130° C. and aqueous formaldehyde (30 parts, 37%) added during 2 hours. A clear brown viscous resin resulted which was soluble in an aqueous solution only after heating the mixture. A tire cord dip was prepared according to the dip preparation procedure of Example II. After standing 15 hours, at room temperature, the dip had become thick and grainy and could not be used to coat tire cords. It was also found that the resin itself was not compatible with the standard polyester tire cord dip as it could not be solubilized with sodium hydroxide and consequently separated from the dip.

A tire cord resin was also prepared according to Example IV of the Belgian patent using phenylisocyanate and resorcinol. This product was insoluble in an aqueous ammoniacal solution and in an aqueous sodium hydroxide solution. Consequently, a final dip could not be prepared from the resin.

From the above, it can be seen that the modified resins of the invention, prepared from the reaction of a monoisocyanate with resorcinol-formaldehyde resins are entirely distinct from reaction products prepared by reacting a monoisocyanate and monomeric resorcinol and subsequent formaldehyde adition.

EXAMPLE V

A series of modified resorcinol-formaldehyde resins were prepared generally according to the procedure of Example I, except that various other monoisocyanates were substituted for phenylisocyanates. The resins produced were used to prepare tire cord dips and tested according to the procedure of Example II. The results of the use of various other monoisocyanates are listed in Table II.

Table II.—¼″ H-test at 212° F.[3]

Monoisocyanate
| | |
|---|---|
| Methyl | 16.7 |
| Ethyl | 19.0 |
| Isopropyl | 19.2 |
| Butyl | 19.4 |
| Cyclohexyl | 19.4 |
| o-Chlorophenyl | 20.9 |

[3] Cords cured 2 min. at 450° F.

EXAMPLE VI

A resorcinol-butyraldehyde-formaldehyde resin was prepared according to the teachings of U.S. 3,242,118. The resin was prepared by substantially completely reacting at a temperature between 120° C. and the boiling point of the reaction mixture, resorcinol with about 0.3 mole of butyraldehyde per mole of resorcinol in the presence of an acid catalyst. The resorcinol-butyraldehyde condensation product was subsequently reacted with 0.4 mole of formaldehyde per mole of resorcinol at about 105° C. to produce a resorcinol-butyraldehyde resin.

This resin was reacted with phenylisocyanate generally according to the procedure of Example I and the product employed in a tire cord adhesive dip according to Example II. Polyester cord coated with the dip showed excellent adhesion to rubber stock.

EXAMPLE VII

The procedure of Example I was followed except that the amount of phenylisocyanate was increased to 0.20 mole per mole of resorcinol in the resorcinol-aldehyde resin. The resulting modified brittle resin could not be dissolved in alkali solution. The addition of about 800 parts of modified resin to a mixture of 25 parts of 50% sodium hydroxide in 270 parts of water resulted in a two-phase mixture unsuitable for use in an adhesive dip.

We claim:

1. Method of making a resorcinol-aldehyde resin of improved bonding properties comprising, contacting a resorcinol-aldehyde resin with 0.02–0.20 mole, per mole of resorcinol present in said resin, of a monoisocyanate of the formula:

$$R-N=C=O$$

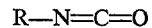

wherein R is selected from the group consisting of lower alkyl, lower alkenyl, cyclohexyl, phenyl, lower alkyl phenyl, lower alkoxy phenyl, and chlorophenyl, at a temperature of about 100–160° C. for a time sufficient to react said monoisocyanate with free hydroxyl groups present in said resorcinol-aldehyde resin.

2. Method of making a resorcinol-aldehyde resin of improved bonding properties comprising:
   (a) substantially dehydrating a resorcinol-aldehyde resin to remove free water contained therein;
   (b) contacting said substantially dehydrated resorcinol-aldehyde resin with 0.02–0.20 mole, per mole of resorcinol present in said resin, of a monoisocyanate of the formula:

$$R-N=C=O$$

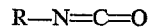

wherein R is selected from the group consisting of lower alkyl, lower alkenyl, cyclohexyl, phenyl, lower alkyl phenyl, lower alkoxy phenyl and chlorophenyl; at a temperature of about 100–160° C. for a time sufficient to react said monoisocyanate with free hydroxyl groups present in said resorcinol-aldehyde resin.

3. The method of claim 1 wherein said monoisocyanate is phenylisocyanate.

4. The resorcinol-aldehyde resin produced according to the method of claim 1.

5. A tire cord adhesive dip containing the resorcinol-aldehyde resin of claim 1.

6. A rubber coated textile tire cord prepared by dipping a textile tire cord in the adhesive of claim 4.

7. The rubber coated textile tire cord of claim 6 wherein the textile tire cord comprises polyester fiber.

8. The rubber coated textile tire cord of claim 6 wherein the textile tire cord is comprised of nylon.

9. The rubber coated textile tire cord of claim 6 wherein the textile tire cord is comprised of rayon.

References Cited

UNITED STATES PATENTS

| | | | |
|---|---|---|---|
| 3,133,034 | 5/1964 | St. Clair et al. | 260—29.3 |
| 3,194,294 | 7/1965 | van Gils | 152—330 |
| 3,226,276 | 12/1965 | Rye et al. | 156—335 |
| 3,242,118 | 3/1966 | St. Clair et al. | 260—29.3 |
| 3,268,467 | 8/1966 | Rye et al. | 260—293 |
| 3,325,333 | 6/1967 | Kigane et al. | 156—331 |

WILLIAM H. SHORT, *Primary Examiner.*

HOWARD SCHAIN, *Assistant Examiner.*

U.S. Cl. X.R.

117—124, 163, 138.8, 161, 132; 260—29.3, 30.2, 8.46, 3; 152—330; 156—331, 335